(12) United States Patent
Turner et al.

(10) Patent No.: US 9,976,426 B2
(45) Date of Patent: May 22, 2018

(54) FAN PLATFORM WITH STIFFENING FEATURE

(71) Applicant: United Technologies Corporation, Hartford, CT (US)

(72) Inventors: Matthew A. Turner, Wallingford, CT (US); Royce E. Tatton, Blackfoot, ID (US); Kristin Wood, Middletown, CT (US); Matthew Satterwhite, West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 314 days.

(21) Appl. No.: 14/805,081

(22) Filed: Jul. 21, 2015

(65) Prior Publication Data

US 2017/0022824 A1    Jan. 26, 2017

(51) Int. Cl.
| | |
|---|---|
| *F01D 5/22* | (2006.01) |
| *F01D 11/00* | (2006.01) |
| *B29C 70/68* | (2006.01) |
| *B29C 70/70* | (2006.01) |
| *B29C 70/84* | (2006.01) |

(Continued)

(52) U.S. Cl.
CPC ............ *F01D 5/225* (2013.01); *B29C 70/682* (2013.01); *B29C 70/70* (2013.01); *B29C 70/84* (2013.01); *B29C 70/865* (2013.01); *F01D 5/02* (2013.01); *F01D 11/008* (2013.01); *B29K 2309/08* (2013.01); *B29K 2619/00* (2013.01); *B29K 2627/12* (2013.01); *B29K 2707/04* (2013.01); *B29L 2031/082* (2013.01); *F05D 2220/36* (2013.01); *F05D 2230/23* (2013.01); *F05D 2300/431* (2013.01); *F05D 2300/432* (2013.01);

(Continued)

(58) Field of Classification Search
CPC .......... F01D 5/225; F01D 5/02; F01D 11/008; F01D 5/30; F01D 5/282; F01D 5/32; F01D 5/323; B29C 70/682; B29C 70/70; B29C 70/84; B29C 70/865; B29K 2309/08; B29K 2619/00; B29K 2627/12; B29K 2707/04; B29L 2031/082; F05D 2220/36; F05D 2230/23; F05D 2300/431; F05D 2300/432; F05D 2300/603; Y02T 50/672
USPC ...................................... 416/220 R
See application file for complete search history.

(56) References Cited

U.S. PATENT DOCUMENTS

| | | | |
|---|---|---|---|
| 3,294,364 A | 12/1966 | Stanley | |
| 5,049,035 A * | 9/1991 | Marlin | ....... F01D 5/22 416/193 A |

(Continued)

FOREIGN PATENT DOCUMENTS

EP    2503102    9/2012

OTHER PUBLICATIONS

Extended European Search Report dated Nov. 25, 2016 in European Application No. 16180615.3.

*Primary Examiner* — Kenneth Bomberg
*Assistant Examiner* — Brian Delrue
(74) *Attorney, Agent, or Firm* — Snell & Wilmer L.L.P.

(57) ABSTRACT

A fan blade platform is provided. The fan blade platform may include a wall, a first sidewall extending from the flowpath to a circular member, and a second sidewall extending from the flowpath to the circular member. A (Continued)

stiffening member may also extend from the circular member to the flowpath and be formed integrally with the first sidewall, the second sidewall, and the flowpath.

15 Claims, 7 Drawing Sheets

(51) Int. Cl.
  *B29C 70/86* (2006.01)
  *F01D 5/02* (2006.01)
  B29K 309/08 (2006.01)
  B29K 619/00 (2006.01)
  B29K 627/12 (2006.01)
  B29K 707/04 (2006.01)
  B29L 31/08 (2006.01)

(52) U.S. Cl.
  CPC ....... *F05D 2300/603* (2013.01); *Y02T 50/672* (2013.01)

(56) References Cited

U.S. PATENT DOCUMENTS

| | | | |
|---|---|---|---|
| 5,957,658 A * | 9/1999 | Kasprow | F01D 11/008 415/134 |
| 6,520,742 B1 | 2/2003 | Forrester et al. | |
| 2011/0143081 A1* | 6/2011 | Fritz | B29C 70/30 428/77 |
| 2014/0003958 A1* | 1/2014 | Turner | F01D 11/008 416/244 A |
| 2014/0271143 A1 | 9/2014 | Feeney | |

\* cited by examiner

FAN PLATFORM WITH STIFFENING FEATURE

FIELD OF INVENTION

The present disclosure relates to gas turbine engines, and, more specifically, to a composite fan platform and stiffening feature.

BACKGROUND

Gas turbine engines, such as turbofan engines for an aircraft, may include a fan section, a compression section, a combustion section, and a turbine section. The fan section may include a rotor assembly and a stator assembly. The rotor assembly of the fan may further include a fan hub and a plurality of outwardly extending airfoils. Each airfoil may include a blade portion, a root portion, and a platform. The blade portion of the airfoil may extend through the flow path and interact with the gases in the flow path to transfer energy between the rotor assembly and the gases. The platform typically extends circumferentially from the rotor blade to an adjacent rotor blade and is disposed radially between the blade portion and the root portion. The stator assembly may include a fan case, which circumscribes the rotor assembly in close proximity to the tips of the blades.

During operation, the fan draws the gases (air) into the engine. The fan (driven by the turbine) raises the pressure of this air, thus producing useful thrust. Improvements in fan performance depend in many cases on reducing fluid flow leakage at various points in the fan. One of these places is between adjacent fan blades at the inner radial portions thereof near the fan hub. Typically, platforms are utilized to seal this gap and to form the inner fan air flow path between the fan blades.

Platforms assemblies may be created from stock along with the fan blade. Rubber flap seals may then seal the gaps between adjacent fairing assemblies. As fan blades are typically constructed of alloys, machining the platform assembly from stock is expensive and time consuming. Alternative materials, such as composite materials, may be used to form platforms. However, the alternative materials may be subject to flexion and deformation depending on the material strength.

SUMMARY

A fan blade platform comprising a flowpath, a first sidewall extending from the flowpath to a circular member, and a second sidewall extending from the flowpath to the circular member. A stiffening member may also extend from the circular member to the flowpath and be formed integrally with the first sidewall, the second sidewall, and the flowpath.

In various embodiments, the first sidewall, the second sidewall, the circular member, and the stiffening member are formed integrally. The fan blade platform may comprise a laminar structure. The laminar structure may comprise a first inner layer and a first outer layer formed into a first lobe, and a second inner layer and a second outer layer formed into a second lobe with the first lobe and the second lobe contacting along the stiffening member. A plurality of layers may be wrapped around the first, the second lobe, and the circular member. A fiberglass layer may partially cover the plurality of layers. A layer may include at least one of synthetic rubber or fluoropolymer elastomer defining an outer surface of the flowpath.

A fan blade assembly may comprise a hub configured to rotate about an axis, a fan blade coupled to the hub, and a platform configured to rotate with the fan blade and the hub. The blade platform may include a wall having a circumferential orientation, a first sidewall extending radially from a circular member to the flowpath, a second sidewall extending radially from a circular member to the flowpath, and a stiffening member extending radially from the circular member to the flowpath. The stiffening member may be disposed between the first sidewall and the second sidewall. A pin may engage the circular member and retain the platform.

In various embodiments, the first sidewall, the second sidewall, and the stiffening member may be formed integrally. The platform may have a laminar structure. The laminar structure may include a first inner layer and a first outer layer formed into a first lobe, and a second inner layer and a second outer layer formed into a second lobe with the first lobe and the second lobe contact along the stiffening member. A plurality of layers may be wrapped around the first, the second lobe, and the circular member. A fiberglass layer may be partially covering the plurality of layers. A layer including at least one of synthetic rubber or fluoropolymer elastomer may define an outer surface of the flowpath. The plurality of layers may include carbon fiber. The stiffening member may also have arms defining an opening.

A method of making a fan blade platform may include laying up a first layer and a second layer on a first mandrel to form a first lobe and laying up a third layer and a fourth layer on a second mandrel to form a second lobe. A fifth layer may be wrapped around the first lobe, the second lobe, and a circular member with the first lobe contacts the second lobe. The method may also include molding the first lobe, the second lobe, the circular member, and the fifth layer integrally.

In various embodiments, the method may include the step of placing a layer of fiberglass partially over the fifth layer. A sixth layer may be placed over the fifth layer and may include at least one of synthetic rubber or fluoropolymer elastomer defining an outer surface of the flowpath. The first layer, the second layer, and the fifth layer comprise carbon fiber.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
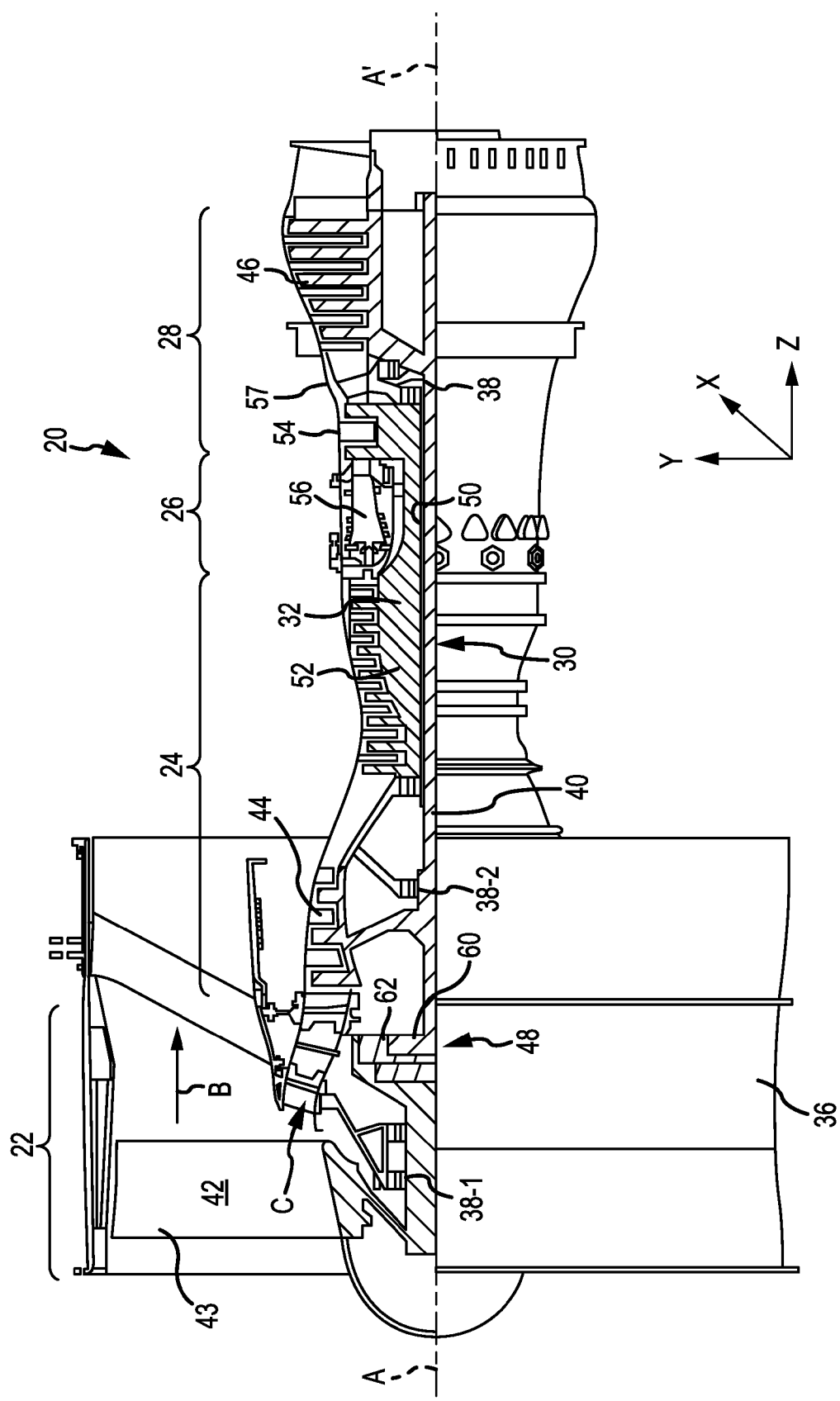
FIG. 1 illustrates an exemplary gas-turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2. In various embodiments, bearing system 38, bearing system 38-1, and bearing system 38-2 may be contained within a bearing housing and/or integrated into an oil delivery system, as described in further detail below.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle.

Figure 2:
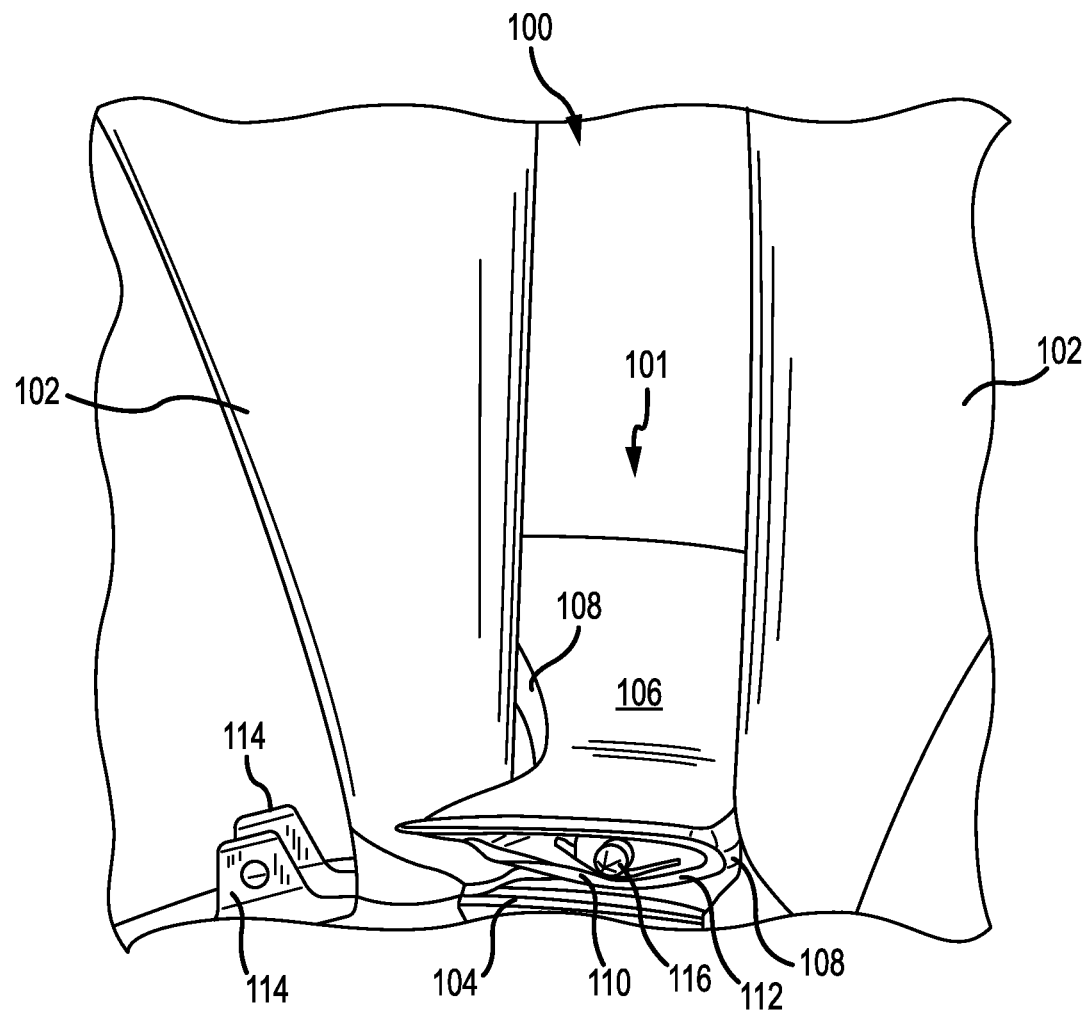
FIG. 2 illustrates a fan assembly with a molded platform, in accordance with various embodiments.

With reference to FIG. 2, a fan assembly 100 is shown, in accordance with various embodiments. In addition to hub 104 and blades 102, fan assembly 100 includes platform assembly 101 and pin 116. Platform assembly 101 may include an outer wall 106 (also referred to herein as a flowpath), seals 108, and sidewall 110 and sidewall 112. Hub 104 includes tabs 114.

In various embodiments, blades 102 may be mounted to, and extend from, hub 104. Blades 102 may comprise an array of blades that form flow passages between them. Platform assemblies 101 (only one is shown in FIG. 2) may be disposed in an inner radial portion of flow passages between adjacent blades 102 and extend substantially the entire length of blades 102. In various embodiments, platform assembly 101 may be mounted to hub 104. Outer wall 106 may extend between blades 102 and comprises a platform that forms an inner radial flow surface of the flow passage between blades 102. Seals 108 may be disposed between platform assembly 101 and blades 102. Seal 108 can be constructed of an elastomeric material such as rubber, thermoplastics, or other suitable materials.

In various embodiments, sidewall 110 and sidewall 112 connect to and extend from opposing sides of outer wall 106. Thus, sidewall 110 may be disposed adjacent a suction side of a first blade and sidewall 112 may be disposed adjacent a pressure side of a second blade. Sidewall 110 and sidewall 112 may extend toward one another and toward hub 104 in general, and are disposed about tabs 114.

In various embodiments, a pin 116 may extend through platform assembly 101 and be received in tabs 114. Pin 116 may extend below outer wall 106 and between sidewall 110 and sidewall 112. As will be describe subsequently, platform assembly 101 has one or more mounting structure that are adapted to receive both tabs 114 and pin 116 to mount the platform assembly 101 to the hub 104. Platform assembly 101 may also comprise a stiffening member, described further in FIG. 4, extending radially from the mounting structure to increase platform rigidity.

Figure 3A:
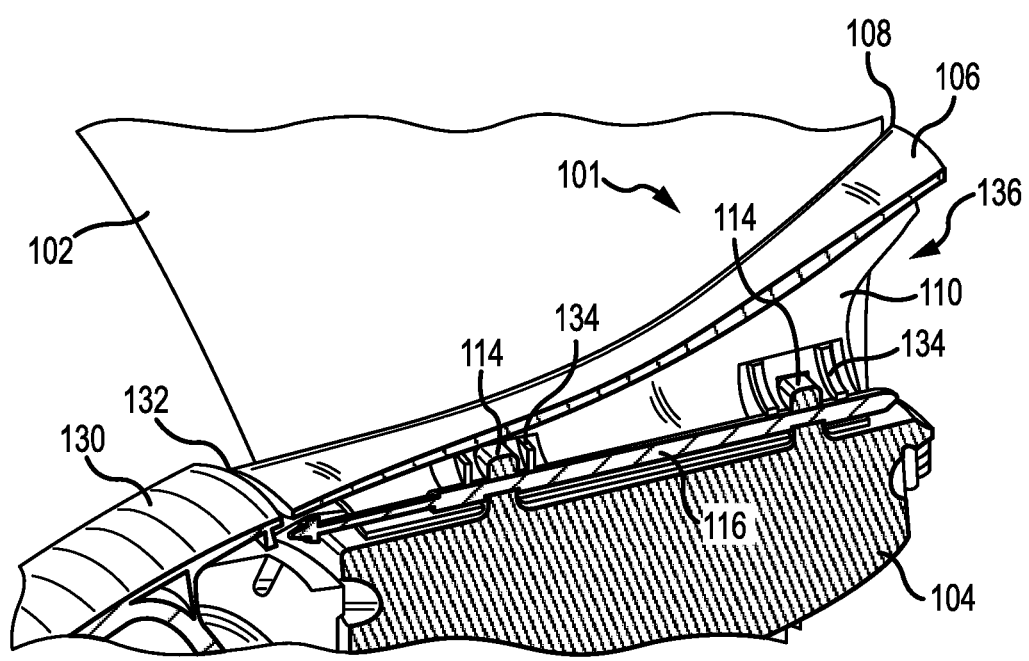
FIG. 3A illustrates a cross-sectional perspective view of a fan assembly having a molded platform, in accordance with various embodiments.
Figure 3B:
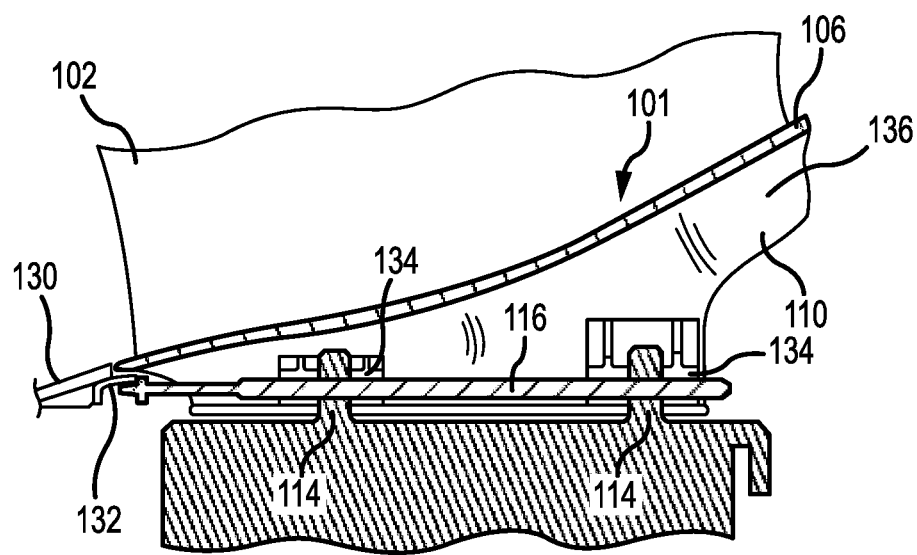
FIG. 3B illustrates a cross-sectional elevation view of a fan assembly having a molded platform, in accordance with various embodiments.

With reference to FIGS. 3A and 3B, cross-sectional views of platform assembly 101 are shown with spinner 130 and shoulder 132, in accordance with various embodiments. Outer wall 106 may extend to seals 108 along blade 102. Sidewall 110 may connect to outer wall 106 and extend away from blade 102 toward pin 116 and a rim of hub 104. Together, outer wall 106 and sidewall 110 and sidewall 112 (FIG. 2) may form cavity 136 that extends from a forward portion of hub 104 to an aft portion of hub 104. Pin 116 may extend through cavity 136 from a forward portion of hub 104 to an aft portion of hub 104. Spinner 130 may be disposed forward of hub 104 and connected to hub 104. Shoulder 132 may be connected to spinner 130 and may interface with pin 116. Shoulder 132 may provide a stop to limit travel of the pin 116.

In various embodiments, sidewall 110 may not contact a rim of hub 104 but may be supported at a distance by mounting structure 134 and pin 116. Mounting structure 134 may be designed to mount around tabs 114 and receive pin 116. Thus, pin 116 may extend through mounting structure 134. Mounting structure 134 may be disposed within cavity 136 about tabs 114. Mounting structure 134 may be connected to sidewall 110 as well sidewall 112 (FIG. 2). Thus, mounting structure 134 may extend between sidewall 110 and sidewall 112.

In various embodiments, mounting structure 134 may enable platform assembly 101 to have a substantially hollow interior configuration for cavity 136, thereby reducing the weight of platform assembly 101. Additionally, mounting structure 134 may simplify wall design, and thereby, facilitate more rapid and simplified layup and manufacture of platform assembly 101.

Figure 4:
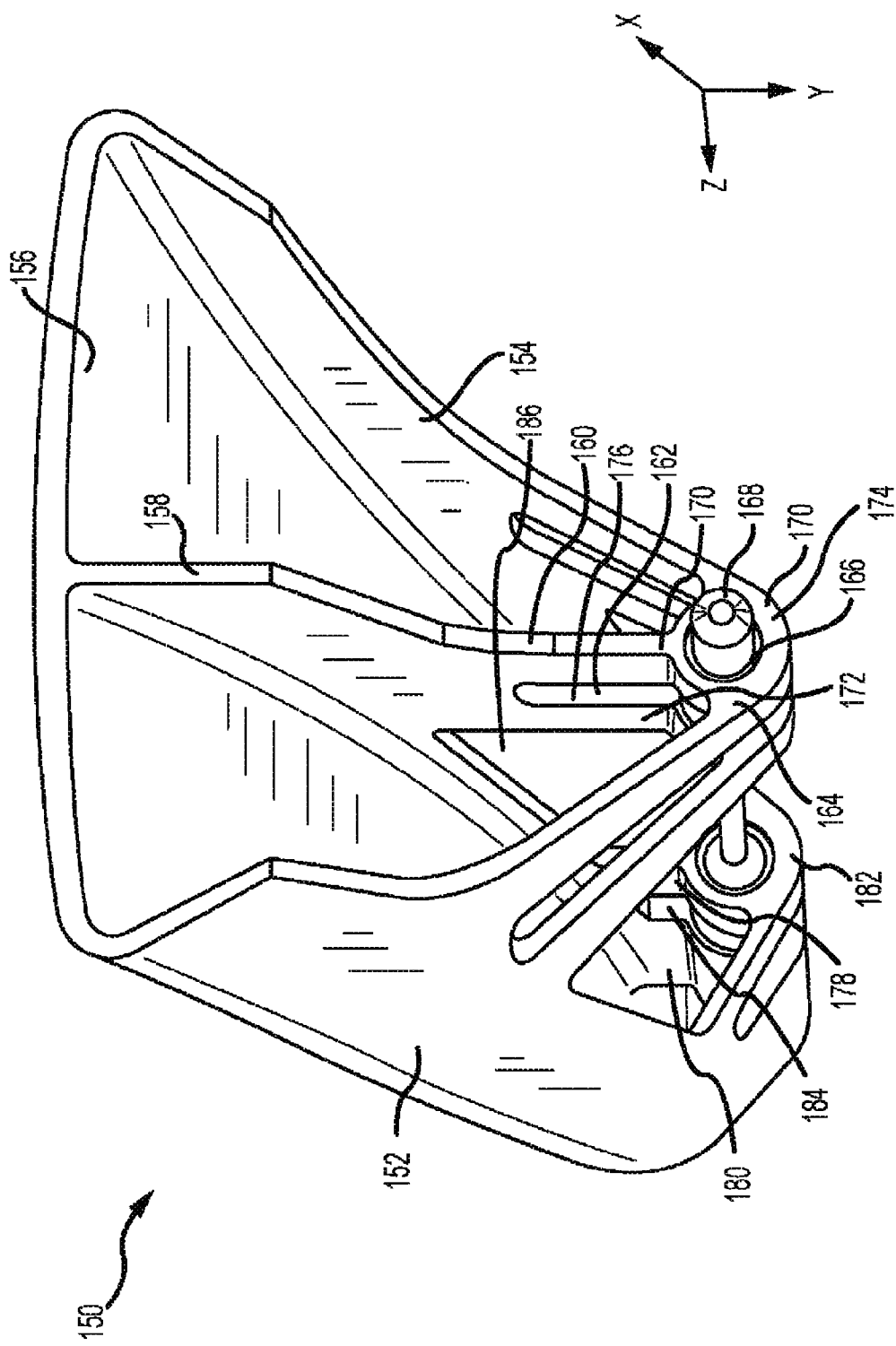
FIG. 4 illustrates a molded platform having an integrated stiffening feature, in accordance with various embodiments.

With reference to FIG. 4, platform 150 is shown with stiffening member 158, in accordance with various embodiments. Platform 150 may comprise sidewall 152, wall 156 in the flow path, and sidewall 154 defining a triangular geometry. Sidewall 152 and sidewall 154 may extend to and be formed integrally with mounting structure 170 such that a laminar layer of platform 150 may partially define sidewall 152, sidewall 154, and mounting structure 170. Features of platform 150 formed integrally may be formed in such a manner that the features share one or more laminar layer partially defining the features. A circular member 164 may define a cylindrical opening in mounting structure 170 configured to receive bushing 166 and/or pin 168. Pin 168 may be a retention device for fixing platform 150 in place on a fan assembly by extending through circular member 164 in the z direction relative to the provided xyz axis.

In various embodiments, stiffening member 158 may extend from wall 156 in the y direction to meet circular member 164. Stiffening member 158 may be formed integrally with sidewall 152, wall 156, sidewall 154, and circular member 164. Stiffening member may comprise arms 160 defining openings 162. Openings 162 may reduce the overall weight of platform 150. Stiffening member 158 may increase the rigidity of platform 150 and thus tend to reduce deformation of platform 150 in response to rotational forces and flow-path gas pressures, particularly in the x and y directions. In various embodiments, the stiffening member 158 includes a first arm 170 and a second arm 172 extending from a first circular member 174 toward the outer wall 156, the first and second arms 170, 172 defining a first opening 176 in the stiffening member 158. In various embodiments, the stiffening member 158 includes a third arm 178 and a fourth arm 180 extending from a second circular member 182 toward the outer wall 156, the third and fourth arms 178, 180 defining a second opening 184 in the stiffening member 158. In various embodiments, a third opening 186 is disposed between the first and second arms 170, 172 and the third and fourth arms 178, 180, with the third opening 186 extending axially between the first circular member 174 and the second circular member 182.

Figure 5:
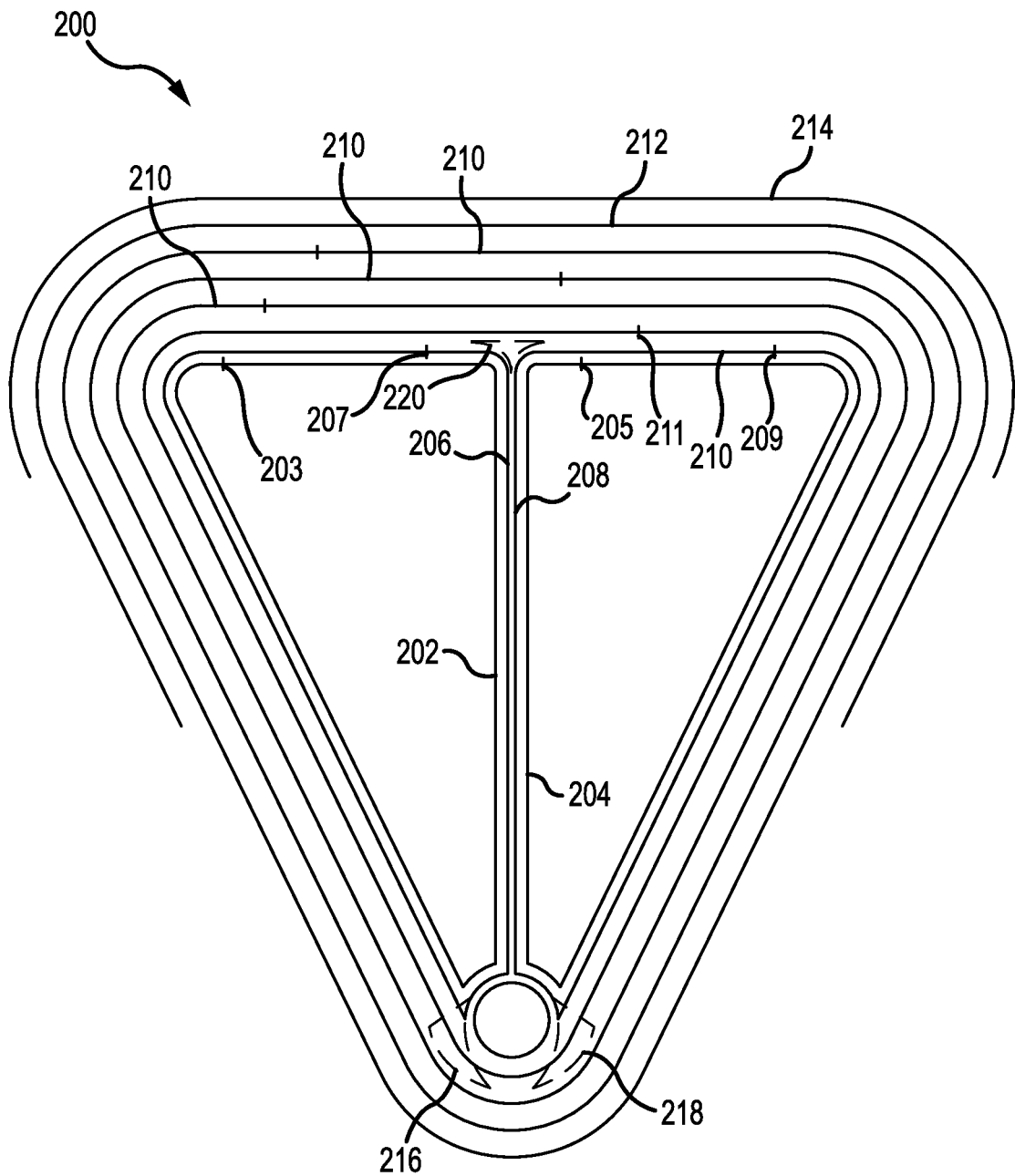
FIG. 5 illustrates a cross sectional view of a molded platform having a laminar structure and an integrated stiffening feature.

With reference to FIG. 5, a laminar structure 200 is shown as a cross sectional of platform 150 of FIG. 4, in accordance with various embodiments. Laminar structure 200 may comprise multiple layers of carbon fiber, fiberglass, synthetic rubber, and/or fluoropolymer elastomer such as polytetrafluoroethylene ("PTFE"). The laminar structure 200 may have a triangular geometry. With brief reference to FIG. 4, a first lobe may be laid up on a mandrel having a kidney-shaped or triangular geometry to define sidewall 152, stiffening member 160, and sidewall 154 of platform 150. The first lobe may comprise an inner layer 202 and an outer layer 206. Inner layer 202 and outer layer 206 may each comprise a sheet of carbon fiber weave or fiberglass weave. A second lobe may also comprise an inner layer 204 and an outer layer 208. Inner layer 204 and outer layer 208 may each comprise a sheet of carbon fiber weave or fiberglass weave. The first and second lobes may be oriented with outer layer 208 contacting outer layer 206 with layers 210 of carbon fiber weave or fiberglass weave wrapped around the two lobes.

In various embodiments, laminar structure 200 may have four to six layers wrapped around the two lobes. A layer 212 of fiberglass may be disposed over an upper surface of layers 210 with a layer 214 of synthetic rubber and/or fluoropolymer elastomer such as those available under the trademark Viton® placed over layer 212. In that regard, layer 212 may at least partially define an outer surface of wall 156 in FIG. 4. Similarly, inner layer 202, outer layer 206, outer layer 208, and inner layer 204 may define arms 160 and stiffening member 158. Stiffening member 158 may extend radially between sidewall 152 and sidewall 154, which also extend radially from circular member 164. A resin matrix may be introduced to the laminar structure to bond together the laminar layers in an integral structure.

In various embodiments, end point 203 of inner layer 202, end point 207 of outer layer 206 may be staggered to prevent joints in each layer from aligning. Similarly, end point 205 of inner layer 204 and end point 209 of outer layer 208 may be staggered. Additionally, layers 210 wrapped around the lobes may have end points 211 staggered so that the joints for all layers do not align and introduce a concentration of weak points in the laminar structure.

In various embodiments, and with reference to FIGS. 4 and 5, layer 212 may cover the end points 211 of layers 210 in a radial direction and extend partially down the length of laminar structure 200 defining sidewall 152 and sidewall 154. Similarly, layer 214 may cover end points 211 of layers 210 in a radial direction and extend partially down the length of laminar structure 200 defining sidewall 152 and sidewall 154. Layer 212 may extend further down the sidewalls than layer 214 so that layer 212 may be partially exposed from layer 214. Portions of laminar structure 200 where outer layer 206 and outer layer 208 have bends or otherwise irregular shapes coming into contact with other layers may form irregularities in the laminar structure. Toe 216 and toe 218 may be disposed on either side of circular member 164 at location where sidewall 152 and sidewall 154 meet circular member 164.

Figure 6:
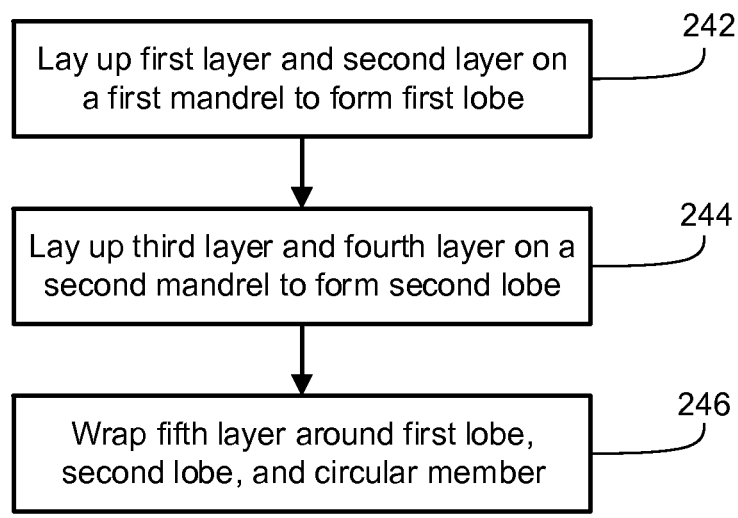
FIG. 6 illustrates a process for making a molded platform having a laminar structure and an integrated stiffening feature.

With reference to FIGS. 5 and 6, a process 240 for making a laminar structure 200 with an integrated stiffening feature is shown, in accordance with various embodiments. Process 240 may begin by laying up a first layer and a second layer on a first mandrel to form a first lobe (Block 242). The first layer and second layer may be inner layer 202 and outer layer 206, for example. A third layer and a fourth layer may be laid up on a second mandrel to form a second lobe (Block 244). The third layer and the fourth layer may correspond to inner layer 204 and outer layer 208, respectively. The process may further include wrapping a fifth layer around the first lobe, the second lobe, and a circular member (Block 246). The first and second lobes may be wrapped such that the first lobe contacts the second lobe. The fifth layer may correspond to layers 210, layer Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan blade platform, comprising:
   an outer wall;
   a first sidewall extending from the outer wall to a first circular member and to a second circular member spaced from the first circular member;
   a second sidewall extending from the outer wall to the first circular member and to the second circular member; and
   a stiffening member extending from the first circular member and the second circular member to the outer wall, the stiffening member formed integrally with the first circular member, the second circular member, and the outer wall
   wherein the stiffening member comprises:
      a first arm and a second arm extending from the first circular member toward the outer wall, the first and second arms defining a first opening in the stiffening member,
      a third arm and a fourth arm extending from the second circular member toward the outer wall, the third and fourth arms defining a second opening in the stiffening member and
      a third opening disposed between the second arm and the third arm, the third opening extending axially between the first circular member and the second circular member.

2. The fan blade platform of claim 1, wherein the first sidewall, the second sidewall, the first circular member, the second circular member and the stiffening member are formed integrally.

3. The fan blade platform of claim 2, further comprising a laminar structure.

4. The fan blade platform of claim 3, wherein the laminar structure comprises:
   a first inner layer and a first outer layer formed into a first lobe; and
   a second inner layer and a second outer layer formed into a second lobe,
   wherein the first lobe and the second lobe contact along the stiffening member.

5. The fan blade platform of claim 4, further comprising a plurality of layers wrapped around the first lobe, the second lobe, the first circular member and the second circular member.

6. The fan blade platform of claim 5, further comprising a fiberglass layer at least partially covering the plurality of layers.

7. The fan blade platform of claim 1, wherein the stiffening member comprises a laminar wall extending from the first circular member and the second circular member to the outer wall.

8. A fan blade assembly, comprising:
a hub configured to rotate about an axis;
a fan blade coupled to the hub;
a platform configured to rotate with the fan blade and the hub, the platform comprising:
an outer wall;
a first sidewall extending from the outer wall to a first circular member and to a second circular member spaced from the first circular member;
a second sidewall extending from the outer wall to the first circular member and to the second circular member; and
a stiffening member extending from the first circular member and the second circular member to the outer wall, the stiffening member formed integrally with the first circular member, the second circular member, and the outer wall
wherein the stiffening member comprises:
a first arm and a second arm extending from the first circular member toward the outer wall, the first and second arms defining a first opening in the stiffening member,
a third arm and a fourth arm extending from the second circular member toward the outer wall, the third and fourth arms defining a second opening in the stiffening member and
a third opening disposed between the second arm and the third arm, the third opening extending axially between the first circular member and the second circular member;
a pin configured to secure the first and second circular members to a tab on the hub and to retain the platform to the hub.

9. The fan blade assembly of claim 8, wherein the first sidewall, the second sidewall, and the stiffening member are formed integrally.

10. The fan blade assembly of claim 8, wherein the platform comprises a laminar structure.

11. The fan blade assembly of claim 10, wherein the laminar structure comprises:
a first inner layer and a first outer layer formed into a first lobe; and
a second inner layer and a second outer layer formed into a second lobe,
wherein the first lobe and the second lobe contact along the stiffening member.

12. The fan blade assembly of claim 11, further comprising a plurality of layers wrapped around the first lobe, the second lobe, and the first and second circular members.

13. The fan blade assembly of claim 12, further comprising a fiberglass layer partially covering the plurality of layers.

14. The fan blade assembly of claim 13, further comprising a layer including at least one of synthetic rubber or fluoropolymer elastomer defining an outer surface of the outer wall.

15. The fan blade assembly of claim 12, wherein the plurality of layers comprises carbon fiber.

* * * * *